US009272249B2

(12) United States Patent  
Ferguson (10) Patent No.: US 9,272,249 B2
(45) Date of Patent: Mar. 1, 2016

(54) CHEMICAL FEEDER (71) Applicant: Axiall Ohio, Inc., Atlanta, GA (US)

(72) Inventor: Richard H. Ferguson, Cecil, PA (US)

(73) Assignee: AXIALL OHIO, INC., Atlanta, GA (US)

(*) Notice: Subject to any disclaimer, the term of this patent is extended or adjusted under 35 U.S.C. 154(b) by 0 days.

(21) Appl. No.: 14/571,346

(22) Filed: Dec. 16, 2014

(65) Prior Publication Data

US 2015/0328598 A1 Nov. 19, 2015

Related U.S. Application Data (60) Provisional application No. 61/992,932, filed on May 14, 2014.

(51) Int. Cl.
| | |
|---|---|
| B65G 59/00 | (2006.01) |
| B67D 5/56 | (2006.01) |
| B08B 3/00 | (2006.01) |
| C02F 1/68 | (2006.01) |
| B01D 11/02 | (2006.01) |
| B01F 1/00 | (2006.01) |
| B01F 15/02 | (2006.01) |
| B01F 5/00 | (2006.01) |

(52) U.S. Cl.
CPC ............ B01F 1/0038 (2013.01); B01F 1/0016 (2013.01); B01F 1/0022 (2013.01); B01F 5/0057 (2013.01); B01F 15/0254 (2013.01); C02F 1/688 (2013.01); B01F 2215/0036 (2013.01)

(58) Field of Classification Search
CPC ....... A61L 2/00; B01F 1/0027; B01F 5/0496; B01F 15/00344; C02F 1/688; C02F 2103/42
USPC ....... 137/268; 222/129, 478; 221/92; 134/43, 134/84, 93; 422/261, 265, 275, 277; 210/748.16, 749
See application file for complete search history.

(56) References Cited

U.S. PATENT DOCUMENTS

| | | |
|---|---|---|
| 2,820,701 A | 1/1958 | Leslie |
| 5,089,127 A | 2/1992 | Junker et al. |
| 5,384,102 A | 1/1995 | Ferguson et al. |
| 5,427,748 A | 6/1995 | Wiedrich et al. |
| 5,441,073 A | 8/1995 | Hoadley |
| 5,810,043 A | 9/1998 | Grenier |
| 6,138,703 A | 10/2000 | Ferguson et al. |
| 6,298,871 B1 | 10/2001 | Pickens et al. |
| 6,517,727 B2 | 2/2003 | Pickens et al. |
| 6,544,487 B1 | 4/2003 | Ferguson et al. |
| 7,081,232 B1 | 7/2006 | Dooley, Jr. et al. |
| 7,604,018 B2 * | 10/2009 | King .................. B01F 1/0033 137/1 |
| 2005/0150823 A1 | 7/2005 | Eserkaln et al. |
| 2010/0012560 A1 | 1/2010 | Sims et al. |

* cited by examiner

Primary Examiner — Monzer R Chorbaji
(74) Attorney, Agent, or Firm — The Webb Law Firm (57) ABSTRACT The present invention relates to a chemical feeder that includes a housing (11) having a housing chamber (20) therein, a support plate (35) within the housing chamber that includes a plurality of support plate apertures (44), and a plurality of nozzles (69, 72) that each have a distributor head (78) that extends up through the support plate. Each distributor head distributes a feed liquid horizontally above the upper surface (38) of the support plate. The chemical feeder, with some embodiments, further includes a diverter plate (122) that extends upward from the support plate at an angle (125) of less than 90°. The diverter plate divides an upper housing chamber (146) into a first upper housing chamber (152) that includes solid chemical material, and a second upper housing chamber (155) that is free of solid chemical material.

14 Claims, 8 Drawing Sheets

CHEMICAL FEEDER

CROSS REFERENCE TO RELATED PATENT APPLICATION

The present application is entitled to and claims priority of U.S. Provisional Patent Application No. 61/992,932, filed on May 14, 2014, the disclosure of which is incorporated herein by reference in its entirety.

FIELD

The present invention relates to a chemical feeder that includes a housing, a support plate within the housing that includes a plurality of support plate apertures, and a plurality of nozzles that each have a distributor head that extends up through the support plate, and which distributes a feed liquid horizontally above the upper surface of the support plate.

BACKGROUND

Chemical feeders can be used to produce various mixtures, such as aqueous solutions of water treating agents that can be used for the disinfection of effluent from sewage treatment plants, for the chlorination of water in swimming pools and hot tubs, and for the delivery of other water soluble chemicals, such as pH control agents, to aqueous streams and water systems. In some instances, a solid treatment chemical is placed within the chemical feeder, where it comes into contact with a liquid, such as water, introduced therein so as to form a treated liquid composition, such as a treated aqueous composition. It is typically desirable that the chemical feeder produce treated liquid compositions that contain a controllable and reproducible level of treatment chemical therein. Variability in the rate at which a solid treatment chemical dissolves in the liquid that is introduced into the chemical feeder can result in an undesirable variation in the concentration of treatment chemical in the treated liquid that is removed from the chemical feeder during operation thereof. In the case of pH control agents, for example, such variability in the concentration of the pH control agent(s) can result in undesirable variability in the pH of the treated liquid. In some instances, pH control agents are used to adjust the pH of a liquid stream containing sanitizing agent(s) for purposes of optimizing the performance of the sanitizing agent(s). If the concentration of pH control agent(s) drops below or above a predetermined operating range, the performance of the sanitizing agent can be undesirably reduced.

In some situations, the solid treatment chemical charged to a chemical feeder is exposed to excess liquid, which results in the solid treatment dissolving too quickly, and/or the formation of a treated liquid having an undesirably high level of treatment chemical. The solid treatment chemical dissolving too quickly can result in the need to frequently charge the chemical feeder with new or replacement solid treatment chemical.

To reduce the frequency of charging a chemical feeder with new or replacement solid treatment chemical, the dimensions of the chemical feeder can be increased, so it can hold a larger amount of solid treatment chemical. Chemical feeders having larger dimensions can undesirably provide a treated liquid output having an undesirably variable amount of dissolved solid chemical therein.

It would be desirable to develop new chemical feeders that can be used to produce treated liquid compositions from solid treatment chemicals. It would be further desirable that such newly developed chemical feeders provide a desirable rate at which the solid treatment chemical dissolves, and a controllable, reliable, and reproducible level of treatment chemical in the treated liquid compositions that are removed from the chemical feeder. It would be further desirable that such newly developed chemical feeders can be scaled up to larger dimensions without compromising desirable performance properties, such as providing a controllable, reliable, and reproducible level of treatment chemical in the treated liquid compositions that are removed from the chemical feeder.

SUMMARY

In accordance with the present invention, there is provided, a chemical feeder that comprises: (a) a housing having a housing base and a housing sidewall that together define a housing chamber within said housing; and (b) a support plate comprising an upper surface and a lower surface, said support plate residing within said housing chamber and being positioned above an inner surface of said housing base, said support plate comprising a plurality of support plate apertures, and said support plate being adapted to support a solid chemical material on said upper surface of said support plate. The chemical feeder further comprises: (c) at least one inlet in said housing through which a feed liquid is introduced into said housing; (d) a plurality of nozzles that are each independently in fluid communication with at least one inlet, each nozzle comprising a distributor head comprising a distributor head sidewall and a dome, and said distributor head sidewall comprising a plurality of distributor head apertures; and (e) at least one outlet in said housing through which a treated liquid comprising dissolved chemical material is removed from said housing. Each distributor head, of each nozzle, extends through the support plate, each dome and each distributor head aperture is positioned above the upper surface of the support plate, and each distributor head distributes the feed liquid passing, there-through, horizontally through the distributor head apertures above the upper surface of the support plate.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1 through 8 like characters refer to the same components and/or streams, such as liquid streams, as the case may be, unless otherwise stated.

DETAILED DESCRIPTION

As used herein, the singular articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing dimensions, quantities of ingredients, flow rates, pressures, and so forth used in the specification and claims are to be understood as modified in all instances by the term "about."

All documents, such as but not limited to issued patents and patent applications, referred to herein, and unless otherwise indicated, are to be considered to be "incorporated by reference" in their entirety.

As used herein, spatial or directional terms, such as "left", "right", "inner", "outer", "above", "below", "vertically", "upward", and the like, relate to embodiments of the invention as depicted in the drawing figures. However, it is to be understood that the invention can assume various alternative orientations and, accordingly, such terms are not to be considered as limiting.

Figure 1:
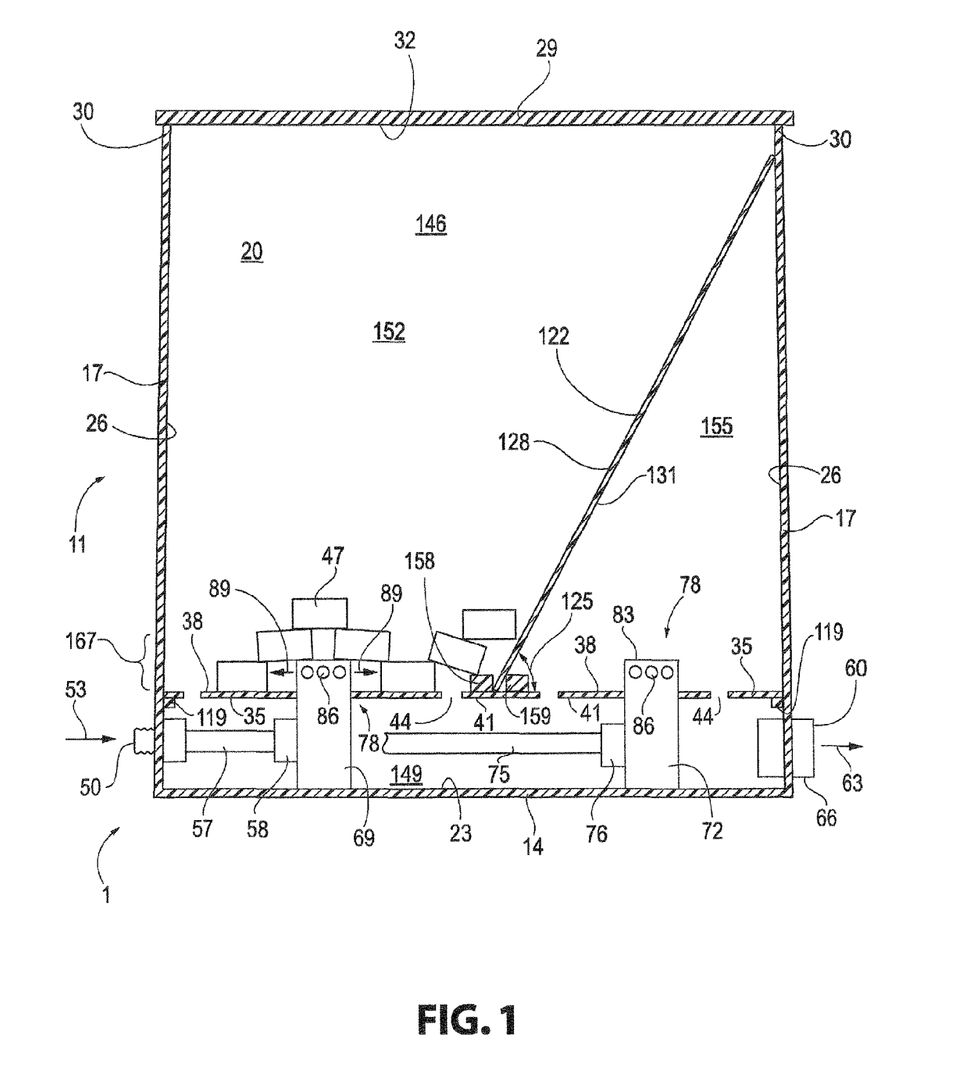
FIG. 1 is a representative side elevational sectional view of a chemical feeder in accordance with some embodiments of the present invention, which includes a diverter plate.
Figure 7:
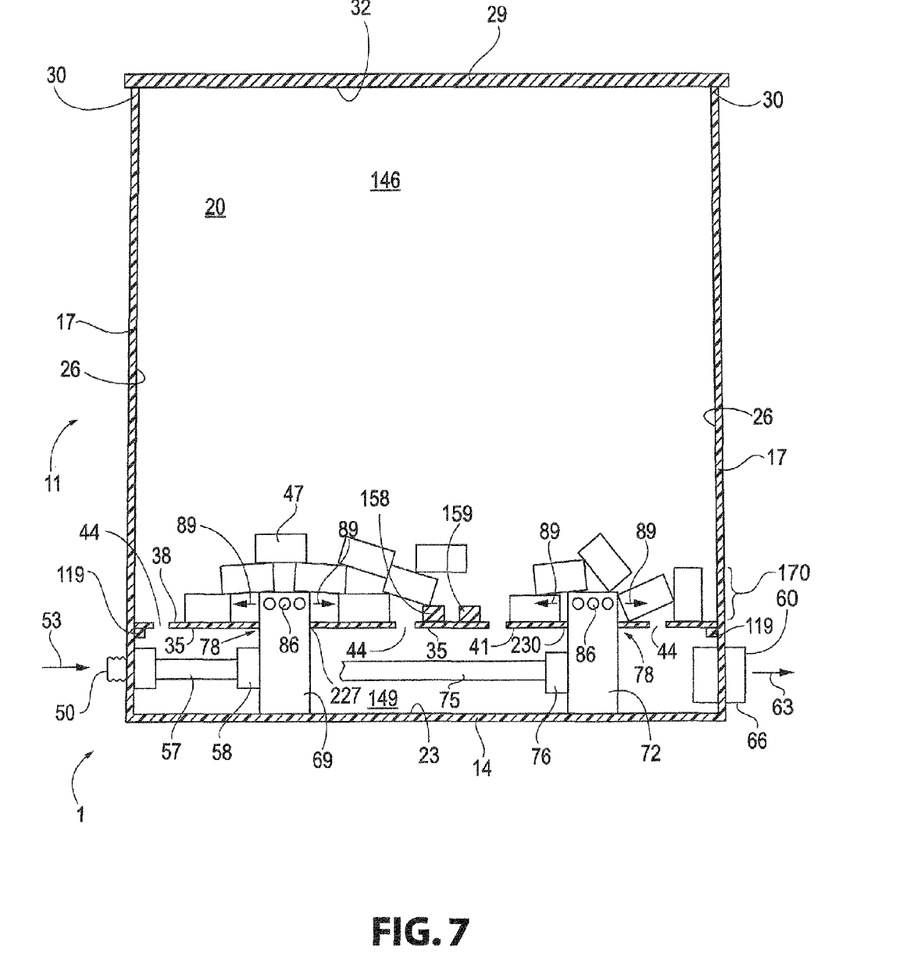
FIG. 7 is a representative side elevational sectional view of the chemical feeder of FIG. 1, which does not include a diverter plate.

With reference to FIGS. 1 and 7 of the drawings, there is depicted a chemical feeder 1 according to some embodiments of the present invention. Chemical feeder 1 includes a housing 11 that includes a housing base 14 and a housing sidewall 17 that extends upward from housing base 14. Housing base 14 and housing sidewall 17 together define a housing chamber 20 that resides within housing 11. More particularly, housing base 14 has an inner surface 23, and housing sidewall 17 has an inner surface 26. Inner surface 23 of housing base 14 and inner surface 26 of housing sidewall 17 together define housing chamber 20, with some embodiments.

The housing of the chemical feeder includes a housing sidewall, such as housing sidewall 17. As used herein the term "a housing sidewall" means "at least one housing sidewall" that, with some embodiments, defines a housing sidewall structure, and correspondingly includes singular and plural referents thereof. With some embodiments, housing sidewall 17 is a unitary sidewall (or unitary sidewall structure). With some further embodiments, the housing sidewall is composed of two or more housing sidewalls.

Housing 11, with some embodiments, is a recta-tubular housing. Housing 11 can, with some further embodiments, have other shapes including, but not limited to, cylindrical shapes, spherical shapes, and multi-sided shapes, such as, square-tubular, hexa-tubular and octa-tubular. With some embodiments, the shape of housing chamber 20 defined by interior surfaces 23 and 26 can be different than the external shape of housing sidewall 17 and housing base 14. For purposes of non-limiting illustration, the exterior shape of housing sidewall 17 can be square, and housing base 14 can be square or circular, while interior surfaces 23 and 26 define a substantially cylindrical housing chamber 20 (not shown).

Housing base 14 is affixed to the bottom of housing sidewall 17. With some embodiments, housing base 14 is attached to the bottom of housing sidewall 17 by art-recognized reversibly closeable systems, such as, matching threaded sections and/or fasteners (not shown). In accordance with some further embodiments, housing base 14 is attached to housing sidewall 17 by a substantially permanent system, such as by adhesives and/or welds. With some embodiments, housing base 14 and housing sidewall 17 together form (or are) a unitary housing base-housing sidewall structure.

Housing 11, with some embodiments, has a closed top. With some further embodiments, the top of housing 11 is closed with a lid, which can be reversibly closeable. With reference to FIG. 1, chemical feeder 1 includes a lid 29 that is attached to a top or upper end 30 of housing sidewall 17. Lid 29 engages sealingly with the top/upper end 30 of housing sidewall 17, with some embodiments. Lid 29 can be attached to the top of housing sidewall 17 by art-recognized systems, which include, for example, bolts, clamps, and/or matching threaded sections (not shown). One or more gaskets (not shown) can be sealingly interposed between an inner surface 32 of lid 29 and the top 30 of housing sidewall 17, with some embodiments. The interior surface 32 of lid 29 together with the interior surfaces 26 and 23 of housing sidewall 17 and housing base 14, also serve to define housing chamber 20, with some embodiments.

With further reference to FIGS. 1 and 7, chemical feeder 1 also includes a support plate 35, which has an upper surface 38, a lower surface 41, and a plurality of support plate apertures 44 that extend from lower surface 41 to upper surface 38 of support plate 35. Support plate 35 is positioned within housing chamber 20 and above the inner surface 23 of housing base 14.

The support plate can be supported within the housing chamber and above the inner surface of the housing base by systems including, but not limited to, a plurality support plate support legs and/or at least one ledge that extends inward from the inner surface of the housing sidewall, as described in further detail herein.

Support plate 35 is adapted to support a solid chemical material 47 on upper surface 38 of support plate 35. The solid chemical material 47 as depicted in FIGS. 1 and 7 is in the form of a plurality of tablets, of which a limited number of tablets are shown (for ease of depiction). With some embodiments, a plurality of tablets are present in housing chamber 20, supported by support plate 35, and extend further up towards inner surface 32 of lid 29 (no shown). The solid chemical material can, with some embodiments, be in the form of granules, pellets, and/or tablets, provided that it is of a size that will not fall down through or otherwise clog one or more support plate apertures 44. The solid chemical materials that can be used with the chemical feeders of the present invention are described in further detail herein.

Each support plate aperture of the support plate can independently have any suitable shape, such as circular shapes, elliptical shapes, polygonal shapes (such as, triangular, rectangular, pentagonal, hexagonal shapes, etc.), and combinations thereof. With some embodiments, each support plate aperture has a substantially circular shape, and each support plate aperture independently has a diameter of from 5 mm to 55 mm, or from 15 mm to 45 mm, or from 25 to 35 mm.

The support plate of the chemical feeders of the present invention can have any suitable shape, such as circular shapes, elliptical shapes, polygonal shapes (such as, triangular, rectangular, pentagonal, hexagonal shapes, etc.), and combinations thereof. With some embodiments, and as depicted in the drawing figures, the support plate has a substantially rectangular shape.

The chemical feeder of the present invention includes at least one inlet in the housing through which a feed liquid is introduced into the housing. With reference to FIGS. 1 and 7, chemical feeder 1 further includes at least one inlet 50 in housing 11 through which a feed liquid, as depicted with arrow 53, is introduced into housing 11, such as into housing chamber 20. Each inlet, such as inlet 50, can, with some embodiments, be positioned in any appropriate position in housing 11. Each inlet, such as inlet 50, is positioned below the support plate, such as support plate 35, with some embodiments. With some embodiments, each inlet is located in a sidewall of the housing. As depicted in FIGS. 1 and 7, inlet 50 is positioned in sidewall 17, in accordance with some embodiments. With some embodiments, each inlet is in fluid communication with at least one inlet pipe that extends underneath the support plate. With reference to FIGS. 1 and 7, and in accordance with some embodiments, inlet 50 is in fluid communication with an inlet pipe 57 that extends underneath support plate 35.

Figure 2:
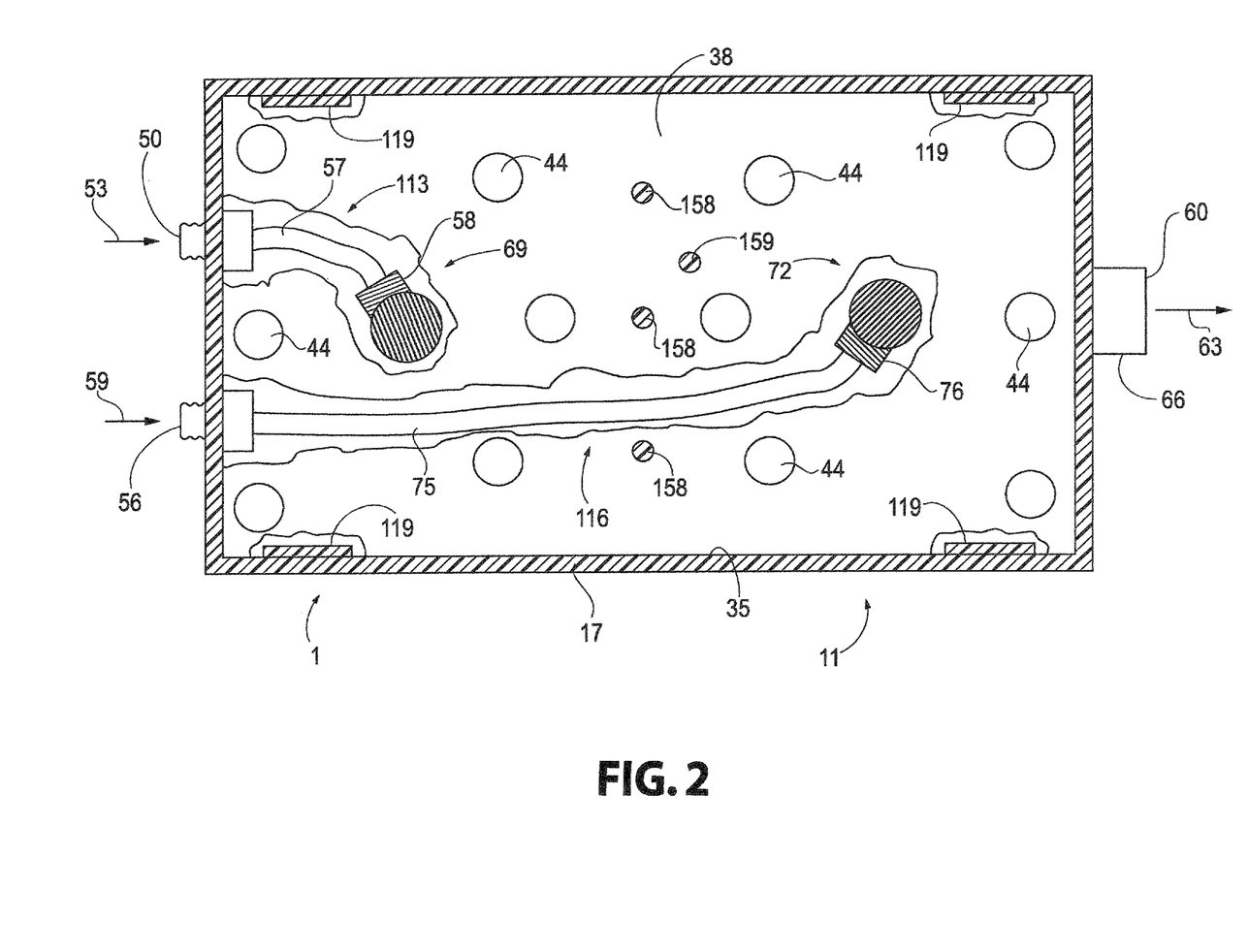
FIG. 2 is a representative partial cut-away top plan view of the housing chamber of a chemical feeder according to some embodiments of the present invention.

Each inlet of the chemical feeder can have the same or a different feed liquid introduced there-through, with some embodiments. With reference to FIG. 2, chemical feeder 1 includes two inlets 50 and 56 that are each positioned below support plate 35. A first feed liquid as indicated by arrow 53 is introduced into housing 11 through inlet 50. A second feed liquid as indicated by arrow 59 is introduced into housing 11 through inlet 56. Feed liquid 53 and feed liquid 59 can have the same composition or a different composition, with some embodiments. In accordance with some embodiments, feed liquid 53 and feed liquid 59 have the same composition, and correspondingly are the same feed liquid.

The feed liquid, with some embodiments, is liquid at the conditions under which the chemical feeder is operated, such as conditions of standard temperature and pressure. With some embodiments, the feed liquid includes water and/or one or more organic liquids. Classes of organic liquids that can be present in the feed liquid include, but are not limited to: alkanes; haloalkanes; perhaloalkances; cycloalkanes; heterocycloalkanes; aromatic compounds; polycylic aromatic compounds; heteroaromatic compounds; polycyclic heteroaromatic compounds; polycyclic aromatic-heteroaromatic compounds; polycyclic aromatic-cycloakane compounds; ethers; polyethers, such as polyglycol ethers; mono-alcohols; polyalcohols, such as glycols, triols, and tetrols; ether-alcohols; thiol functional compounds; thio-ethers; polysulfides; and combinations of two or more such classes of organic liquids.

The chemical feeder, in accordance with some further embodiments of the present invention, includes at least one outlet 60 in housing 11 through which a treated liquid (as depicted by arrow 63) that includes dissolved chemical material is removed from housing 11, such as from housing chamber 20. Each outlet can be independently positioned in any appropriate portion or portions of housing 11, such as, but not limited to, in housing sidewall 17 and/or housing base 14. With some embodiments, and as depicted in the drawings, outlet 60 is positioned in (or through) housing sidewall 17.

Each outlet is positioned below the support plate, with some embodiments. For purposes of non-limiting illustration and with reference to FIGS. 1 and 7, outlet 60 is positioned below support plate 35, and more particularly, below lower surface 41 of support plate 35. In accordance with some embodiments and with reference to FIGS. 1 and 7, outlet 60 is in fluid communication with an outlet pipe 66 that extends through sidewall 17 of housing 11 and is in fluid communication with housing chamber 20, and with lower housing chamber 149, with some further embodiments.

The chemical feeder of the present invention further includes a plurality of nozzles. The chemical feeder can include, with some embodiments, at least 2 nozzles, such as 2, 3, 4, 5, 6, 7, 8, 9, or 10 or more nozzles. As depicted in the drawings, and in accordance with some embodiments, the chemical feeder includes two nozzles. With reference to FIGS. 1, 2, and 7, chemical feeder 1 includes a plurality of nozzles 69 and 72 that are each independently in fluid communication with at least one inlet. The plurality of nozzles can be in fluid communication with a single inlet, with some embodiments. Each nozzle can independently be in fluid communication with a separate inlet, as discussed in further detail herein, with some embodiments. Two or more nozzles can be in fluid communication with a single inlet, while one or more nozzles can each independently be in fluid communication with a separate nozzle, with some embodiments. With some embodiments, and with reference to FIGS. 1, 2, and 7, nozzle 69 is in fluid communication with inlet 50 by way of inlet conduit 57, and nozzle 72 is in fluid communication with inlet 56 by way of inlet conduit 75.

Fluid communication between a nozzle and an inlet can, with some embodiments, include one or more couplings, in addition to an inlet pipe. With reference to FIGS. 1, 2, and 7, inlet pipe 57 is connected to a nozzle coupling 58 that provides fluid communication between inlet pipe 57 and nozzle 69, with some embodiments. With further reference to FIGS. 1, 2, and 7, inlet pipe 75 is connected to a nozzle coupling 76 that provides fluid communication between inlet pipe 75 and nozzle 72, with some embodiments.

With reference to FIGS. 1, 2, 4, and 7, each nozzle, such as nozzles 69 and 72, includes a distributor head 78. Each distributor head 78 includes a distributor head sidewall 80 and a distributor head dome 83. Each distributor head sidewall 80 includes a plurality of distributor head apertures 86. Each distributor head aperture can have any suitable shape, such as, but not limited to, circular shapes, elliptical shapes, polygonal shapes (e.g., triangular, rectangular, square, pentagonal, hexagonal, heptagonal, and octagonal shapes, etc.), irregular shapes, and combinations of two or more such shapes.

Each distributor head aperture of the distributor head can independently have any suitable size. With some embodiments, each distributor head aperture is substantially circular, and independently has a diameter of from 5 to 25 mm, or from 10 to 20 mm, or from 15 to 17 mm.

As used herein the term "a distributor head sidewall" means "at least one distributor head sidewall" that, with some embodiments, defines a distributor head sidewall structure, and correspondingly includes singular and plural referents thereof. With some embodiments, the distributor head sidewall is a unitary distributor head sidewall (or a unitary distributor head sidewall structure). With some further embodiments, the distributor head sidewall is composed of two or more distributor head sidewalls (not depicted in the drawings).

Dome 83 of distributor head 78 is attached to the top of distributor head sidewall 80 by art-recognized attachment systems, such as, but not limited to, adhesives, fasteners, nuts and bolts combinations, clamps, an annular groove optionally including an annular gasket, and combinations thereof (not shown). The dome of the distributor head can have any suitable configuration and shape. With some embodiments, the dome of the distributor head is substantially flat (as depicted in the drawings). With some further embodiments, the dome of the distributor head can have a shape selected from polygonal shapes, arcuate shapes, and combinations thereof (not shown) that, with some embodiments, extends into the housing chamber above the upper surface of the support plate. With some embodiments, dome 83 is continuous with distributor head sidewall 80.

Each distributor head 78 extends through support plate 35, such that each dome 83 and each distributor head aperture 86 is positioned above upper surface 38 of support plate 35. Each distributor head, being so positioned, distributes feed liquid horizontally (as indicated by arrows 89) through distributor head apertures 86 above upper surface 38 of support plate 35.

Each distributor head independently extends up through a hole in the support plate. Each distributor head can, with some embodiments, be independently received sealingly or non-sealingly through the hole in the support plate through which it extends. With some embodiments a gasket (not shown) resides abuttingly and sealingly between the distributor head sidewall and the hole in the support plate through which the distributor head extends. With reference to FIG. 7, distributor head 78 of nozzle 69 extends up through hole 227 of support plate 35, and distributor head 78 of nozzle 72 extends up through hole 230 of support plate 35.

Figure 5:
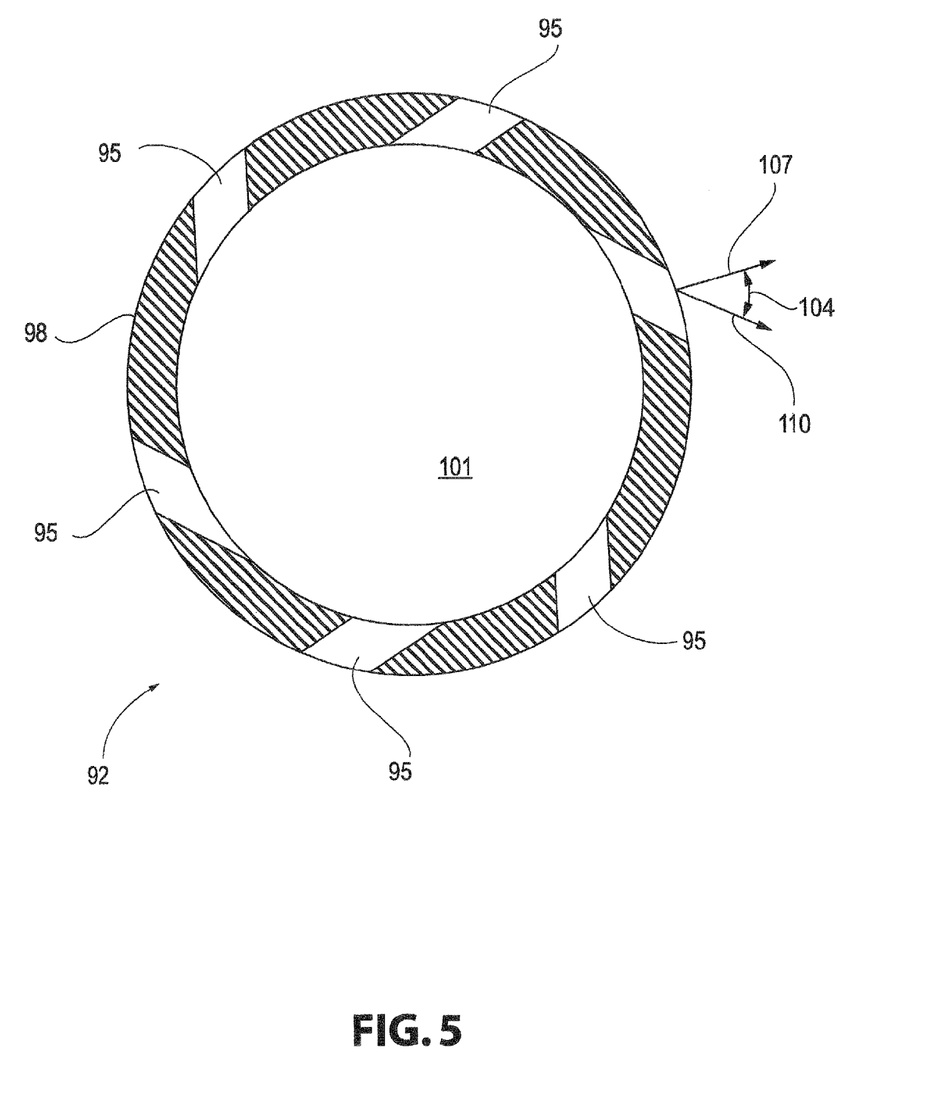
FIG. 5 is a representative top plan sectional view of a distributor head according to some embodiments of the present invention that includes tangential distributor head apertures.

In accordance with some embodiments, the distributor head apertures of at least one distributor head are tangential distributor head apertures through which feed liquid is distributed tangentially above the upper surface of the support plate. For purposes of non-limiting illustration and with reference to FIG. 5, distributor head 92 includes a plurality of tangential distributor head apertures 95 that extend through distributor head sidewall 98. Each tangential distributor head aperture 95 is in fluid communication with the distributor head interior space 101. With some embodiments and as depicted in FIG. 5, the tangential distributor head apertures are aligned so as to provide liquid exiting from the distributor head with a torsional or cyclonic motion. As used herein, the term "tangential distributor head aperture(s)" means a distributor head aperture that has an alignment angle 104 of greater than 0° and less than 90°. The alignment angle 104 is determined as between a reference line 107 extending directly out from the surface of the distributor head sidewall and an alignment line 110 of the tangential distributor head aperture. With some embodiments, when the distributor head has a substantially circular cross-section, reference line 107 corresponds to a radius line extending out from the center of the circular cross-section. Each tangential distributor head aperture independently has an alignment angle. With some embodiments, the alignment angles of at least two tangential distributor head apertures are different from each other. With some further embodiments, each alignment angle of each tangential distributor head aperture is the same.

Figure 4:
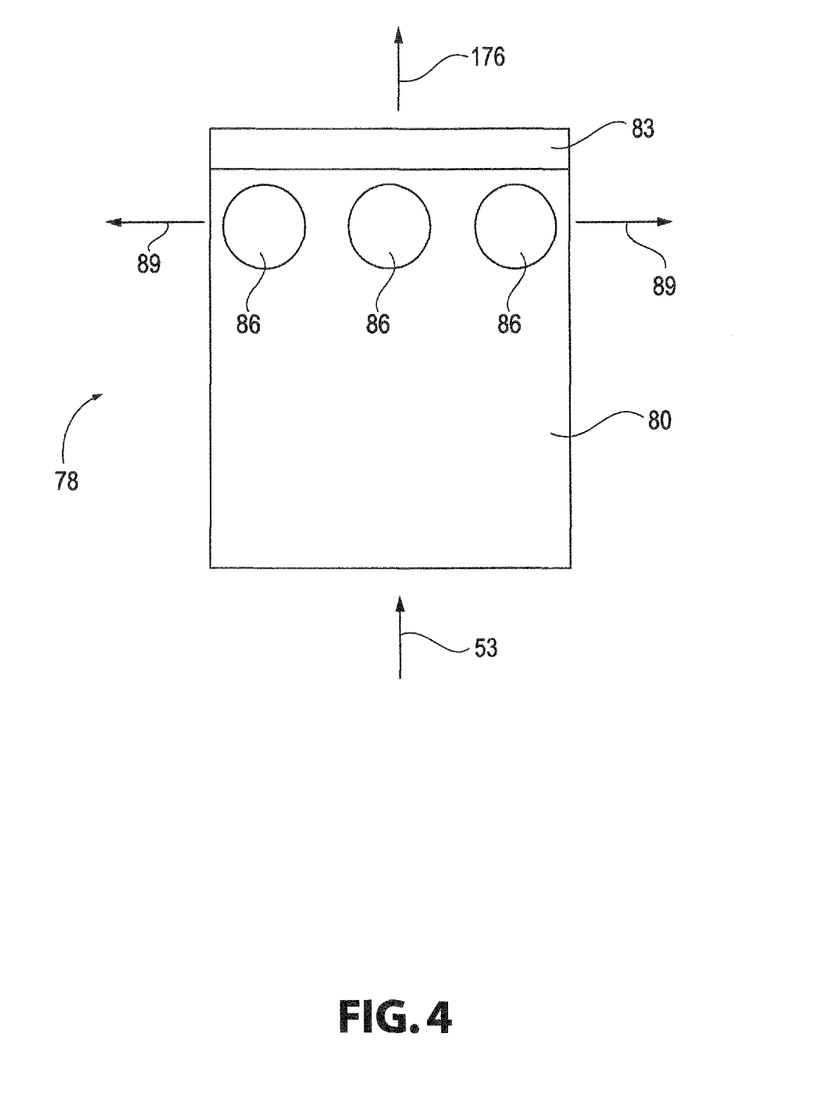
FIG. 4 is a representative side elevational view of a distributor head of a nozzle of a chemical feeder in accordance with some embodiments of the present invention.
Figure 6:
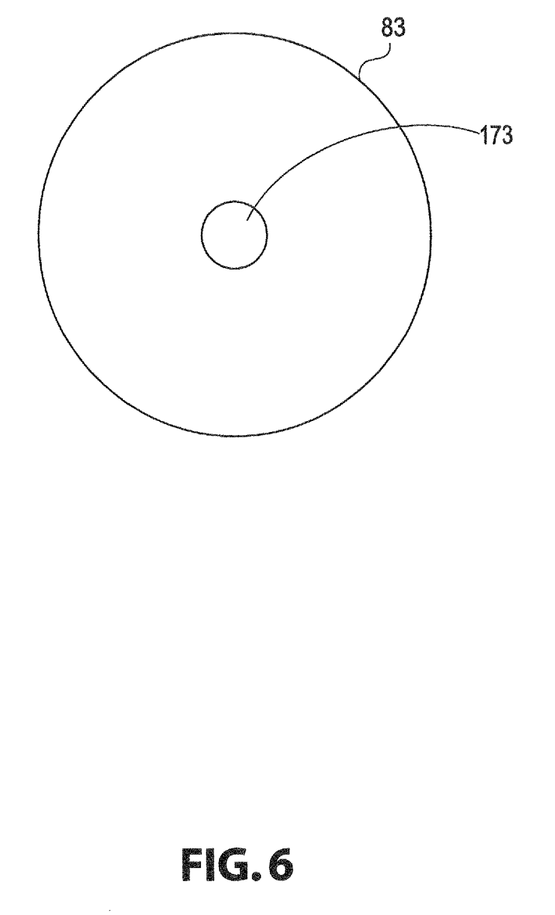
FIG. 6 is a representative top plan view of the dome of a distributor head, in accordance with some embodiments, which includes a dome hole.

In accordance with some embodiments of the present invention, the dome of the at least one distributor head includes at least one dome hole, which distributes feed liquid vertically into the housing chamber. With reference to FIGS. 4 and 6, dome 83 of distributor head 78 includes a dome hole 173. Feed liquid passing up through distributor head 78 passes vertically out of distributor head 78 through dome hole 173 as indicated by arrow 176 (FIG. 4). Each dome hole can have any suitable shape, such as, but not limited to, circular shapes, elliptical shapes, polygonal shapes (e.g., triangular, rectangular, square, pentagonal, hexagonal, heptagonal, octagonal shapes, etc.), irregular shapes, and combinations of two or more such shapes. With some embodiments, the dome of each distributor head is free of one or more dome holes.

Each dome hole of the distributor head can independently have any suitable size. With some embodiments, each dome hole is substantially circular, and has a diameter of from 1 to 6 mm, or from 2 to 5 mm, or from 2 to 4 mm.

The chemical feeder, in accordance with some embodiments, includes a plurality of inlets, and the plurality of inlets and the plurality of nozzles form a plurality of separate inlet-nozzle pairs that are in separate fluid communication with each other. For purposes of non-limiting illustration and with reference to FIG. 2, chemical feeder 1 includes a first inlet 50 and a first nozzle 69 that together form a first inlet-nozzle pair 113 that are in fluid communication with each other by way of inlet conduit 57. With further reference to FIG. 2, chemical feeder 1 also includes a second inlet 56 and a second nozzle 72 that together form a second inlet-nozzle pair 116 that are in fluid communication with each other by way of inlet conduit 75.

Each inlet conduit, with some embodiments of the chemical feeders of the present invention, can be independently selected from rigid inlet conduits and flexible inlet conduits.

The inlet conduits of the separate inlet-nozzle pairs can each be independently selected from rigid inlet conduits, flexible inlet conduits, and combinations thereof. With some embodiments of the present invention, at least one separate inlet-nozzle pair includes a flexible inlet conduit that provides fluid communication between the inlet and the nozzle of the separate inlet-nozzle pair. As depicted in FIG. 2, and in accordance with some embodiments, inlet conduit 57 of first inlet-nozzle pair 113 is a flexible inlet conduit, and inlet conduit 75 of second inlet-nozzle pair 116 is a flexible inlet conduit. The flexible inlet conduits can be fabricated from art-recognized flexible materials.

The support plate, in accordance with some embodiments of the chemical feeder of the present invention, is supported above the housing base by at least one ledge that extends inward from an inner surface of the housing sidewall. The ledge upon which the support plate is supported can, with some embodiments be a substantially continuous ledge that extends inward from an inner surface of the housing sidewall. With some further embodiments, the ledge upon which the support plate is supported includes of a plurality of separate ledges that each extend inward from an inner surface of the housing sidewall. With reference to FIGS. 1, 2, and 7, and in accordance with some embodiments, support plate 35 is supported above housing base 14 by a plurality of separate ledges 119 that extend inward from inner surface 27 of housing sidewall 17. With some embodiments an outer portion or portions of lower surface 41 of support plate 35 abut ledges 119, and support plate 35 is supported above inner surface 23 of base plate 14. Support plate 35 and ledges 119 can be fixed together by systems including, but not limited to, adhesives, fasteners (such as, but not limited to, screws, nut and bolt combinations, and/or rivets), welds, and combinations thereof (not shown). With some embodiments support plate 35 abuts ledges 119 in the absence of any fixing system.

The chemical feeder in accordance with some embodiments, further includes a diverter plate that extends upward from the upper surface of the support plate at an angle of greater than 0° and less than 90° relative to the upper surface of the support plate. The diverter plate contacts at least a portion of an inner surface of the housing sidewall. The diverter plate has an upper surface and a lower surface, and the diverter plate supports laterally the solid chemical material against at least a portion of the upper surface of the diverter plate.

With reference to FIG. 1, chemical feeder 1 further includes a diverter plate 122 that extends upward from upper surface 38 of support plate 35 at an angle 125 that is greater than 0° and less than 90° relative to upper surface 38 of the support 35. With some embodiments, angle 125 is determined as between lower (or rear) surface 131 of diverter plate 122 and upper surface 38 of support plate 35. Diverter plate 122 resides within housing chamber 20 of housing 11. Diverter plate 122 contacts a portion of inner surface 26 of housing sidewall 17. The contact between diverter plate 122 and the portion(s) of inner surface 26 of housing sidewall 17 can, with some embodiments, be a sealing contact that prevents substantially liquid, such as feed liquid and/or treated liquid, from passing through the contact point(s) of diverter plate 122 and inner surface 26 of housing sidewall 17. The contact between diverter plate 122 and the portion(s) of inner surface 26 of housing sidewall 17 can, with some embodiments, be a non-sealing contact that allows liquid, such as feed liquid and/or treated liquid, to pass through the contact point(s) of diverter plate 122 and inner surface 26 of housing sidewall 17.

Figure 3:
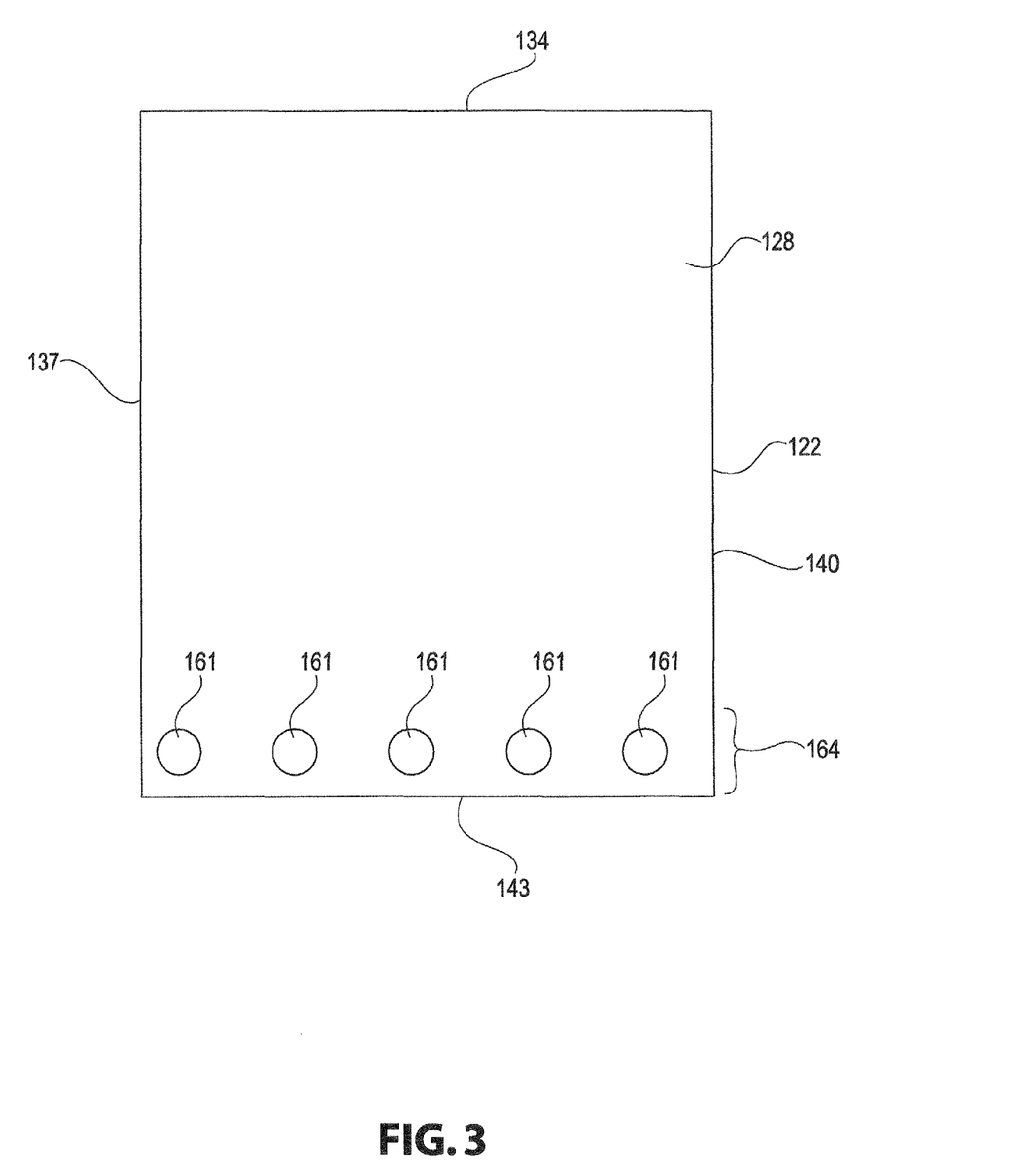
FIG. 3 is a representative top plan view of a deflector plate that includes a plurality of deflector plate apertures.

The diverter plate can have any suitable shape, provided it contacts at least a portion of the inner surface of the housing sidewall. With some embodiments, the diverter plate can have a shape selected from circular shapes, elliptical shapes, polygonal shapes (e.g., triangular, rectangular, square, pentagonal, hexagonal, octagonal shapes, etc.), irregular shapes, and combinations of two or more such shapes. With reference to FIG. 3, diverter plate 122 has a rectangular shape, with some embodiments.

With reference to FIG. 3, and in accordance with some embodiments, diverter plate 122 has an upper edge 134, a first side edge 137, a second side edge 140, and a lower edge 143. Lower edge 143 abuts a portion of upper surface 38 of support plate 35, and upper edge 134 abuts a portion of inner surface 26 of housing sidewall 17. With some embodiments, first side edge 137 and/or second side edge 140 are free from abutment with a portion of inner surface 26 of housing sidewall 17. With some additional embodiments, first side edge 137 and/or second side edge 140 each abut a portion of inner surface 26 of housing sidewall 17.

Diverter plate 122 has an upper surface 128 and a lower surface 131. Diverter plate supports laterally solid chemical material 47 against at least a portion of upper surface 128 of diverter plate 122. With some embodiments, the diverter plate resides reversibly within the housing chamber and is used to reduce the volume of the housing chamber in which solid chemical material is contained.

The diverter plate can, with some embodiments, be attached to the upper surface of the support plate by attachment systems, such as, but not limited to, adhesives, fasteners (such as, but not limited to, screws, nut and bolt combinations, and/or rivets), welds, and combinations of two or more such attachments systems.

The support plate, with some embodiments, includes at least one first peg that extends upward from the upper surface of the support plate, and a lower portion of the upper surface of the diverter plate abuts at least one first peg. With some embodiments, the lower portion of the upper surface of the diverter plate, that abuts at least one first peg, includes a lower edge of the diverter plate. Abutment between the lower portion of the diverter plate and the first peg(s) serves to maintain the support plate in a fixed position on and relative to the upper surface of the support plate, and prevents the lower portion or edge of the diverter plate from sliding or otherwise moving across the upper surface of the support plate. Each first peg can independently have any suitable shape, such as cross-sectional shapes selected from circular shapes, elliptical shapes, polygonal shapes (e.g., triangular, rectangular, square, pentagonal, hexagonal, octagonal shapes, etc.), irregular shapes, and combinations of two or more such shapes. With some embodiments the support plate includes a single first peg that is an elongated first peg that extends upward from the upper surface of the support plate, and extends across at least a portion of the width of the support plate. Each first peg, with some embodiments, is positioned so as to be in opposition to the upper surface of the diverter plate (or on the upper surface side of the diverter plate).

With reference to FIGS. 1, 2, and 3, support plate 35 includes three first pegs 158 that each extend upward from upper surface 38 of support plate 35. A lower portion 164 of upper surface 128 of diverter plate 122, abuts first pegs 158. With some embodiments, the lower portion 164 of upper surface 128 of diverter plate 122, that abuts first pegs 158, includes lower edge 143 of diverter plate 122. Abutment between lower portion 164 of upper surface 128 (or lower edge 143) of diverter plate 122 and first pegs 158 maintains lower edge 143 of diverter plate 122 in a fixed position on and relative to upper surface 38 of support plate 35, and prevents lower edge 143 of diverter plate 122 from moving, such as sliding, across upper surface 38 of support plate 35, thus maintaining the angle 125 between lower surface 131 of diverter plate 122 and upper surface 38 of support plate 35. Each first peg 158, with some embodiments, is positioned so as to be in opposition to upper surface 128 of diverter plate 122 (or on the upper surface 128 side of diverter plate 122).

In accordance with some further embodiments, and in addition to at least one first peg as described above, the support plate includes at least one second peg that extends upward from the upper surface of the support plate, and a lower portion of the lower surface of the diverter plate abuts at least one second peg. Abutment between the lower portion of the lower surface of the diverter plate and the second peg(s) serves to further maintain the support plate in a fixed position on and relative to the upper surface of the support plate, and prevents the lower portion or edge of the diverter plate from sliding or otherwise moving across the upper surface of the support plate. Each second peg can independently have any suitable shape, such as cross-sectional shapes selected from circular shapes, elliptical shapes, polygonal shapes (e.g., triangular, rectangular, square, pentagonal, hexagonal, octagonal shapes, etc.), irregular shapes, and combinations of two or more such shapes. With some embodiments the support plate includes a single second peg that is an elongated second peg that extends upward from the upper surface of the support plate, and extends across at least a portion of the width of the support plate. Each second peg, with some embodiments, is positioned so as to be in opposition to the lower surface of the diverter plate (or on the lower surface side of the diverter plate).

With reference to FIGS. 1, 2, 3, and 8 of the drawings, support plate 35 includes two second pegs 159 that each extend upward from upper surface 38 of support plate 35. A lower portion, such as lower portion 164, of lower surface 131 of diverter plate 122 abuts second pegs 159. Abutment between lower portion 164 of lower surface 131 of diverter plate 122 and second pegs 159 serves to further maintain lower edge 143 of diverter plate 122 in a fixed position on and relative to upper surface 38 of support plate 35, and prevents lower edge 143 of diverter plate 122 from moving, such as sliding, across upper surface 38 of support plate 35, thus maintaining the angle 125 between lower surface 131 of diverter plate 122 and upper surface 38 of support plate 35. Each second peg 159, with some embodiments, is positioned so as to be in opposition to lower surface 131 of diverter plate 122 (or on the lower surface 131 side of diverter plate 122).

In accordance with some embodiments, the housing of the chemical feeder includes an upper housing chamber that resides above the upper surface of the support plate, and a lower housing chamber that resides below the lower surface of the support plate. The diverter plate, with some embodiments, divides the upper housing chamber into a first upper housing chamber and a second upper housing chamber, the solid chemical material resides within the first upper housing chamber, and the second housing chamber is free of solid chemical material.

With reference to FIGS. 1 and 7, housing 11 of chemical feeder 1 includes: an upper housing chamber 146 that resides above upper surface 38 of support plate 35; and a lower housing chamber 149 that resides below lower surface 41 of support plate 35. Upper housing chamber 146 is, with some embodiments, defined at least in part by upper surface 38 of support plate 35, inner surface(s) 26 of housing sidewall(s) 17, and inner surface 32 of lid 29. Lower housing chamber 149 is, with some embodiments, defined at least in part by inner surface 23 of housing base 14, inner surface(s) 26 of housing sidewall(s) 17, and lower surface 41 of support plate 35.

With further reference to FIG. 1, diverter plate 122 divides upper housing chamber 146 into a first upper housing chamber 152 and a second upper housing chamber 155. First upper housing chamber 152 is defined in part by upper surface 128 of diverter plate 122. Second upper housing chamber 155 is defined in part by lower surface 131 of diverter plate 122. Solid chemical material 47 resides within first upper housing chamber 152, and second housing chamber 155 is free of solid chemical material 47.

In accordance with some embodiments: at least one distributor head of at least one nozzle extends up through the support plate and into the first upper housing chamber, and the distributor head apertures thereof are in fluid communication with the first upper housing chamber; and at least one distributor head of at least one nozzle extends up through the support plate and into the second upper housing chamber, and the distributor head apertures thereof are in fluid communication with the second upper housing chamber. With reference to FIG. 1, and in accordance with some embodiments, distributor head 78 of nozzle 69 extends up through support plate 35 and into first upper housing chamber 152. Distributor head apertures 86 of distributor head 78 of nozzle 69 are in fluid communication with first upper housing chamber 152. With reference to FIG. 1, and in accordance with some embodiments, distributor head 78 of nozzle 72 extends up through support plate 35 and into second upper housing chamber 155. Distributor head apertures 86 of distributor head 78 of nozzle 72 are in fluid communication with second upper housing chamber 155.

With some embodiments, at least one distributor head extending through the support plate into the first upper housing chamber has feed liquid passing there-through, and each distributor head extending through the support plate into the second upper housing chamber is free of feed liquid passing there-through.

With reference to FIG. 1 and in accordance with some embodiments, distributor head 78 of nozzle 69 extends through support plate 35 into first upper housing chamber 152, such that the distributor head apertures 86 thereof are in fluid communication with first upper housing chamber 152. First upper housing chamber 152 includes solid chemical material 47, and second upper housing chamber 155 is free of solid chemical material. Distributor head 78 of nozzle 72 extends through support plate 35 into second upper housing chamber 155, such that the distributor head apertures 86 thereof are in fluid communication with second upper housing chamber 155. With diverter plate 122 so positioned, distributor head 78 of nozzle 69 is configured to have feed liquid pass there-through, and during operation of the chemical feeder feed liquid passes there-through, with some embodiments. With diverter plate 122 so positioned, distributor head 78 of nozzle 72 is configured to be free of feed liquid passing there-through, and during operation of the chemical feeder feed liquid does not pass there-through. The flow of feed liquid (such as indicated by arrow 59 of FIG. 2) through to nozzle 72 can, with some embodiments, be shut off by one or more valves (not shown) associated with inlet 56 (FIG. 2). With diverter plate 122 positioned as described above and depicted in FIG. 1, (i) first upper housing chamber 152 containing solid chemical material 47, (ii) second upper housing chamber 155 being free of solid chemical material 47, (iii) allowing feed liquid to flow through one or more nozzles (such as nozzle 69) into first upper housing chamber 152, (iv) while preventing the flow of feed liquid through one or more nozzles (such as nozzle 72) into second upper housing chamber 155, provides increased operational efficiency of the chemical feeder of the present invention, with some embodiments. The diverter plate, with some embodiments, allows the chemical feeder to be operated with a smaller total amount of solid chemical material (such as contained within the first upper housing chamber), without compromising the performance of the chemical feeder relative to the chemical feeder as operated in the absence of the diverter plate.

The diverter plate, with some embodiments of the chemical feeder of the present invention, is free of diverter plate apertures there-through. With some embodiments, the diverter plate includes at least one diverter plate aperture there-through that provides fluid communication between the first upper housing chamber and the second upper housing chamber. In accordance with some further embodiments, the diverter plate includes a plurality of diverter plate apertures that provide fluid communication between the first upper housing chamber and the second upper housing chamber.

The diverter plate aperture(s) can be located in any portion or portions of the diverter plate. With some embodiments, the diverter plate aperture(s) are positioned in a lower portion of the diverter plate, near or proximate to the upper surface of the support plate of the chemical feeder. With reference to FIG. 3, diverter plate 122 includes a plurality of diverter plate apertures 161 that are positioned in a lower portion 164 of diverter plate 122.

In accordance with some embodiments of the present invention, with diverter plate 122 positioned as described above, feed liquid passes up through nozzle 69, out through the distributor head apertures 86 of distributor head 78 thereof, and into first upper housing chamber 152 where it contacts solid chemical material 47 and forms a treated liquid that includes dissolved chemical material (from the solid chemical material 47). When diverter plate 122 is free of diverter plate apertures, the treated liquid passes down through support plate apertures 44 that are in fluid communication with first upper housing chamber 152 and into lower housing chamber 149. From lower housing chamber 149, the treated liquid passes out of housing 11 through outlet pipe 66 and outlet 60, as indicated by arrow 63.

With some additional embodiments, when diverter plate 122 includes diverter plate apertures, such as diverter plate apertures 161, feed liquid passes up through nozzle 69, out through the distributor head apertures 86 of distributor head 78 thereof, and into first upper housing chamber 152 where it contacts solid chemical material 47 and forms a treated liquid that includes dissolved chemical material (from the solid chemical material 47). The treated liquid passes down through support plate apertures 44 that are in fluid communication with first upper housing chamber 152 and into lower housing chamber 149. Some of the treated liquid also passes through at least some of the diverter plate apertures, such as diverter plate apertures 161, into second upper housing chamber 155, and down into lower housing chamber 149 through support plate apertures 44 that are in fluid communication with second upper housing chamber 155. From lower housing chamber 149, the treated liquid passes out of housing 11 through outlet pipe 66 and outlet 60, as indicated by arrow 63.

When the diverter plate is present in the housing of the chemical feeder, the flow of feed liquid into the housing is controlled, with some embodiments, such that only a lower portion of the first upper housing chamber is filled with feed liquid and treated liquid. Controlling the flow of feed liquid such that only a lower portion of the first upper housing chamber is filled with feed liquid and treated liquid, results in wetting of only the solid chemical material that resides within the lower portion of the first upper housing chamber, which results in a controlled rate at which the solid chemical material dissolves into the feed liquid so as to form treated liquid having a controlled and predictable amount of dissolved chemical material therein. Solid chemical material residing above the lower portion of the first upper housing chamber remains substantially free of contact with the feed liquid and the treated liquid, and drops or moves down into the lower portion of the first upper housing chamber as the solid chemical material residing therein dissolves. With some embodiments, the volume of the lower portion of the first upper housing chamber, which is filled with feed liquid and treated liquid during operation of the chemical feeder, is less than or equal to 50 percent, or less than or equal to 40 percent, or less than or equal to 30 percent, or less than or equal to 25 percent, or less than or equal to 20 percent, or less than or equal to 15 percent, or less than or equal to 10 percent, or less than or equal to 5 percent, and greater than 0 percent (such as greater than or equal to 1 percent) of the total volume of the first upper housing chamber, with some embodiments. With reference to FIG. 1 and in accordance with some embodiments, the flow of feed liquid into first upper housing chamber 152 through distributor head 78 of nozzle 69 is controlled such that only lower portion 167 of first upper housing chamber 152 is filled with feed liquid and treated liquid during operation of the chemical feeder.

In accordance with some embodiments, when the diverter plate is not present in the upper housing chamber, the feed liquid distributed by each distributor head contacts solid chemical material supported on the upper surface of the support plate and forms the treated liquid, the treated liquid passes down through the plurality of support plate apertures and out of the housing through the outlet. With reference to FIGS. 7 and 2, and in accordance with some embodiments, feed liquid (as indicated by arrows 53 and 59) is introduced into housing 11 through inlets 50 and 56. The feed liquid passes through inlet conduits 57 and 75 and into nozzles 69 and 72. The feed liquid passes up through nozzles 69 and 72, into distributor head 78 of each thereof, and horizontally out through distributor head apertures 86 of each thereof, as indicated by arrows 89, and into upper housing chamber 146. The feed liquid contacts solid chemical material 47 and forms treated liquid that includes dissolved chemical material (from solid chemical material 47). The treated liquid passes down through support plate apertures 44, which are in fluid communication with upper housing chamber 146, and into lower housing chamber 149. From lower housing chamber 149, the treated liquid passes out of housing 11 through outlet pipe 66 and outlet 60, as indicated by arrow 63.

When the diverter plate is not present in the housing of the chemical feeder, the flow of feed liquid into the housing is controlled, with some embodiments, such that only a lower portion of the upper housing chamber is filled, with feed liquid and treated liquid. Controlling the flow of feed liquid such that only a lower portion of the upper housing chamber is filled with feed liquid and treated liquid, results in wetting of only the solid chemical material that resides within the lower portion of the upper housing chamber, which results in a controlled rate at which the solid chemical material dissolves into the feed liquid so as to form treated liquid having a controlled and predictable amount of dissolved chemical material therein. Solid chemical material residing above the lower portion of the upper housing chamber remains substantially free of contact with the feed liquid and the treated liquid, and drops or moves down into the lower portion of the upper housing chamber as the solid chemical material residing therein dissolves. With some embodiments, the volume of the lower portion of the upper housing chamber, which is filled with feed liquid and treated liquid during operation of the chemical feeder, is less than or equal to 50 percent, or less than or equal to 40 percent, or less than or equal to 30 percent, or less than or equal to 25 percent, or less than or equal to 20 percent, or less than or equal to 15 percent, or less than or equal to 10 percent, or less than or equal to 5 percent, and greater than 0 percent (such as greater than or equal to 1 percent) of the total volume of the upper housing chamber, with some embodiments. With reference to FIG. 7 and in accordance with some embodiments, the flow of feed liquid into upper housing chamber 146 through distributor head 78 of nozzle 69 and distributor head 78 of nozzle 72 is controlled such that only lower portion 170 of upper housing chamber 146 is filled with feed liquid and treated liquid during operation of the chemical feeder.

Figure 8:
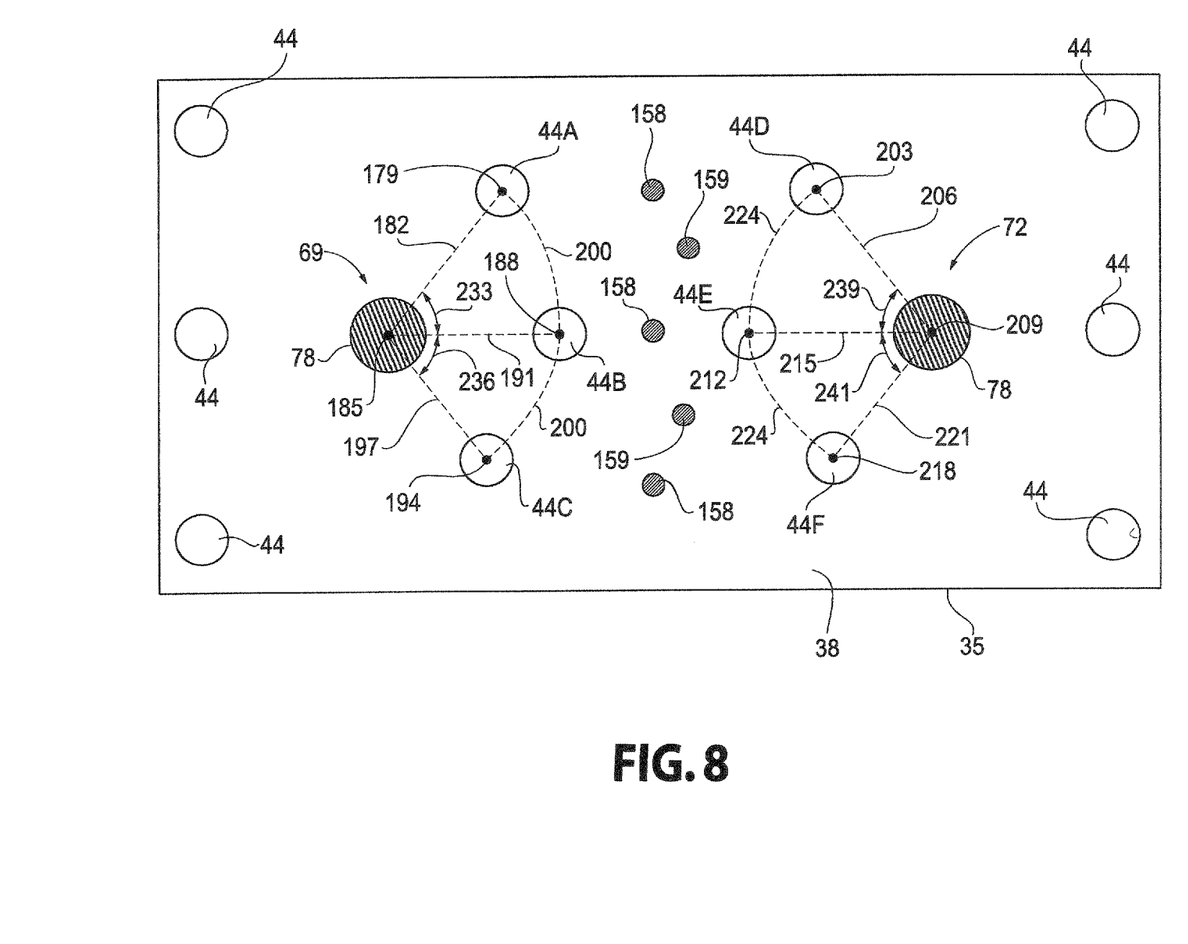
FIG. 8 is a representative top plan view of the upper surface of a support plate of a chemical feeder with distributor heads extending up there-through, in accordance with some embodiments of the present invention.

In accordance with some embodiments of the present invention, each distributor head of each nozzle has associated therewith at least three support plate apertures that are each positioned equidistant relative to a center point of the distributor head and along a circular arc relative to the center of the distributor head (referred to herein as "an equidistant arc associated distributor head-support plate apertures group"). With reference to FIG. 8, distributor head 78 of nozzle 69 has associated therewith three support plate apertures 44A, 44B, and 44C. Center point 179 of support plate aperture 44A is positioned a distance 182 from center point 185 of distributor head 78 of nozzle 69. Center point 188 of support plate aperture 44B is positioned a distance 191 from center point 185 of distributor head 78 of nozzle 69. Center point 194 of support plate aperture 44C is positioned a distance 197 from center point 185 of distributor head 78 of nozzle 69. Distances 182, 191, and 197 are substantially equivalent to each other. In addition, center points 179, 188, and 194 of support plate apertures 44A, 44B and 44C are each positioned along circular arc 200.

With further reference to FIG. 8, and in accordance with some embodiments, distributor head 78 of nozzle 72 has associated therewith three support plate apertures 44D, 44E, and 44F. Center point 203 of support plate aperture 44D is positioned a distance 206 from center point 209 of distributor head 78 of nozzle 72. Center point 212 of support plate aperture 44E is positioned a distance 215 from center point 209 of distributor head 78 of nozzle 72. Center point 218 is positioned a distance 221 from center point 209 of distributor head 78 of nozzle 72. Distances 206, 215, and 221 are substantially equivalent to each other. In addition, center points 203, 212, and 218 of support plate apertures 44D, 44E, and 44F are each positioned along circular arc 224.

The angle between adjacent (or neighboring) support plate apertures of an equidistant arc associated distributor head-support plate apertures group can be the same or different from the angle between any other adjacent (or neighboring) support plate apertures of such group. With reference to FIG. 8, and in accordance with some embodiments, adjacent/neighboring support plate apertures 44A and 44B have an angle 233 there-between (relative to center point 185 of distributor head 78 of nozzle 69), and adjacent/neighboring support plate apertures 44B and 44C have an angle 236 there-between (relative to center point 185 of distributor head 78 of nozzle 69). Angle 233 and angle 236 are substantially equal to each other, with some embodiments. With some further embodiments, angle 233 and angle 236 are different (not depicted). With further reference to FIG. 8, and in accordance with some embodiments, adjacent/neighboring support plate apertures 44D and 44E have an angle 239 there-between (relative to center point 209 of distributor head 78 of nozzle 72), and adjacent/neighboring support plate apertures 44E and 44F there-between (relative to center point 209 of distributor head 78 of nozzle 72). Angle 239 and angle 241 are substantially equal to each other, with some embodiments. With some further embodiments, angle 239 and angle 241 are different (not depicted).

The chemical feeders of the present invention and the various components thereof, such as the support plate, nozzles, distributor heads, and diverter plate, can each be independently fabricated from any suitable material or combination of materials that are chemically and corrosion resistant to the solid chemical material and fluids (or liquids) used. Examples of suitable fabrication materials include, but are not limited to, polyethylene, ABS (acrylonitrile-butadiene-styrene resin), fiberglass reinforced resins, polystyrene, polypropylene, poly(vinyl chloride), chlorinated poly(vinyl chloride) or any other appropriate material(s) that is chemically resistant to the solid chemical being dispensed, such as a sanitizing agent, such as calcium hypochlorite. Other materials such as stainless steel can additionally or alternatively be used, but the use of such material could result in a significant increase in cost of the feeder. With some embodiments, the chemical feeder, including the support plate and diverter plate, is fabricated from poly(vinyl chloride) (PVC), which is generally chemically resistant to water sanitizing chemicals, such as calcium hypochlorite. In accordance with some further embodiments of the present invention, at least a portion of the housing sidewall (such as housing sidewall 17) is fabricated from transparent PVC, which allows for visual inspection of the amount of solid chemical material present in the housing chamber (such as housing chamber 20, upper housing chamber 146, or first upper housing chamber 152) without opening the housing. Plastic parts of the chemical feeder can be fabricated by art-recognized methods including, but not limited to, injection molding or rotational molding.

When constructed of plastic resin material, the various parts of the chemical feeder can, with some embodiments, be joined by solvent or heat welding or by threading. If a metal, such as stainless steel is used, conventional metal welding of the parts can be used to fabricate the chemical feeder. Alternatively, the various parts of the chemical feeder can be joined by conventional threaded bolts and appropriate gaskets to ensure that the chemical feeder is sealed, such as being liquid-tight, such as water-tight. The inlet(s) and outlet(s) of the housing can, with some embodiments, be joined to feed and removal conduits (not shown) by, for example, matched threaded sections, quick release fittings, plastic welding, and/or adhesives (not shown).

The various gaskets or seals, such as annular gaskets associated with the lid, used in the chemical feeder are, with some embodiments, fabricated from resilient materials that are resistant to the solid chemical materials and liquids used. Examples of materials from which the gaskets can be fabricated include, but are not limited to, rubber, such as natural rubber, styrene-butadiene rubber, neoprene rubber and silicone rubber; and fluorinated materials, such as homopolymers and copolymers of tetrafluoroethylene and chlorotrifluoroethylene, and copolymers of vinylidene fluoride and hexafluoropropylene.

The solid chemical material, or treating agent, used with the chemical feeders of the present invention can be any chemical that is solid at ambient (or standard) conditions of temperature and pressure (STP), and which is readily soluble in the feed liquid, such as water, that is introduced into the chemical feeder, at STP conditions. With some further embodiments, the solid chemical material is capable of being formed into pellets or tablets. The solid chemical material, with some further embodiments, is in the form of tablets that have a diameter which is greater than the diameter (or largest dimension) of the support plate apertures, such as support plate apertures 44. Examples of such solid chemical materials, include, but are not limited to: (a) sanitizing agents, such as chemicals that sanitize water, such as calcium hypochlorite, bromo-chloro hydantoins (such as, 1-bromo-3-chloro-5, 5-dimethylhydantoin), dichlorohydantoins and chloroisocyanurates; (b) dechlorination agents such as sodium sulfite, sodium metabisulfite, sodium bisulfite, sodium thiosulfate, sodium hydrosulfide (NaSH), and sodium sulfide ($Na_2S$); and (c) pH control agents such as sodium bisulfate, citric acid, sodium carbonate, sodium bicarbonate and quaternary ammonium compounds, some of which can be used also as algaecides or antibacterial agents.

The chemical feeder of the present invention can, with some embodiments, be integrated into fluid, such as water, treatment operations by appropriate piping connected with inlets 50 and 56, and outlet 60. The chemical feeder can be integrated into, for example: a single pass system, such as an aqueous stream used to sanitize the surface of an article, such as vegetables, such as potatoes or surfaces used in the handling or processing of food; or a closed loop system, such as a swimming pool or hot tub. With some embodiments, the chemical feeder via inlets 50 and 56, and outlet 60, is connected directly (such as in-line) with the main fluid conduit used to recycle and treat fluid, such as water, from a stationary body of fluid, such as a swimming pool.

Various modifications can be made to the chemical feeder of the present invention without departing from the spirit and scope thereof. For purposes of non-limiting illustration, the solid chemical materials can be contained within the housing chamber in one or more canisters or baskets having a plurality of perforations therein, which allow for contact between the solid chemical material and liquid (or fluid) within the housing chamber. The use of canisters or baskets, with some embodiments, can be advantageous when it is desirable to minimize direct contact of the solid chemical with the person who is placing it into the chamber. When one or more canisters are used to place solid chemical material within the housing chamber of the chemical feeder, the housing and canister can be together keyed or otherwise adapted to only allow the insertion of a specifically designed canister into the housing chamber. Keying of the housing and canisters can be used as a method of preventing the addition of incompatible chemical materials to the chamber, such as calcium hypochlorite and chloroisocyanurates. For example and with non-limiting reference to FIG. 7, interior surface 26 of sidewall 17 of chemical feeder 1 can be provided with a vertically elongated raised rectangular member (not shown) that mates slidingly with a matching vertically elongated female slot in the side of a canister that is placed within housing chamber 20 or upper housing chamber 146 (not shown). Such further non-limiting embodiments demonstrate that a wide variety of modifications can be made to the chemical feeder of the present invention without significantly affecting the operation thereof.

The chemical feeders of the present invention can be used in conjunction with methods of treating, such as sanitizing and/or adjusting the pH, a body of liquid, such as a body of water, such as a swimming pool, or a liquid stream. The liquid treating method includes, with some embodiments: (a) providing a chemical feeder as described previously herein, wherein the housing chamber (or upper housing chamber, or first upper housing chamber) contains solid chemical material; (b) introducing, optionally under elevated pressure, a feed liquid stream (such as an aqueous stream), which may be drawn from a body of liquid (such as a body of water) into the inlet of the chemical feeder; (c) removing a treated liquid stream (such as a treated aqueous stream) containing dissolved treating material (such as dissolved sanitizing material or dissolved pH adjusting material) from the outlet of the chemical feeder; and (d) (i) introducing at least a portion of the treated liquid stream into the body of liquid, or (ii) forwarding the treated liquid stream to one or more downstream uses, such as storage. Steps (b) through (d) are performed continuously, with some embodiments.

With some embodiments use of the chemical feeder of the present invention involves, the inlet(s) of the chemical feeder being connected directly in-line with a main water conduit used to handle water withdrawn from a body of water. In this configuration, the outlet of the pump used to recycle the water is in direct fluid communication (by way of a suitable conduit) with the inlet(s) of the chemical feeder, in which case the chemical feeder is located on the pressure side of the recycle pump. The pressure of the liquid stream (such as an aqueous stream) introduced into the inlet(s) of the chemical feeder can vary widely, and is with some embodiments from 5 pounds per square inch (psi) (34 kilopascals) to 15 psi (103 kilopascals), or from 5 psi to 10 psi (69 kilopascals). The flow rate of the liquid stream (such as an aqueous stream) through the chemical feeder can also vary widely, and is, with some embodiments, from 2 to 100 gallons per minute (7.6 to 379 liters per minute), or from 5 to 75 gallons per minute (19 to 284 liters per minute), or from 10 to 50 gallons per minute (38 to 189 liters per minute).

The chemical feeder of the present invention can have a wide range of dimensions. With some embodiments, the dimensions of the chemical feeder, such as the housing sidewall(s) and housing base, are selected such that the upper housing chamber (such as upper housing chamber 146) has a volume of from 25,000 $cm^3$ to 150,000 $cm^3$, or from 50,000 $cm^3$ to 120,000 $cm^3$, or from 95,000 $cm^3$ to 105,000 $cm^3$.

The present invention has been described with reference to specific details of particular embodiments thereof. It is not intended that such details be regarded as limitations upon the scope of the invention except insofar as and to the extent that they are included in the accompanying claims.

What is claimed is:

1. A chemical feeder comprising:
   (a) a housing having a housing base and a housing sidewall that together define a housing chamber within said housing;
   (b) a support plate comprising an upper surface and a lower surface, said support plate residing within said housing chamber and being positioned above an inner surface of said housing base, said support plate comprising a plurality of support plate apertures, and said support plate being adapted to support a solid chemical material on said upper surface of said support plate;
   (c) at least one inlet in said housing through which a feed liquid is introduced into said housing;
   (d) a plurality of nozzles that are each independently in fluid communication with at least one inlet, each nozzle comprising a distributor head comprising a distributor head sidewall and a dome, and said distributor head sidewall comprising a plurality of distributor head apertures; and
   (e) at least one outlet in said housing through which a treated liquid comprising dissolved chemical material is removed from said housing,
   wherein each distributor head extends through said support plate, each dome and each distributor head aperture is positioned above said upper surface of said support plate, and each distributor head distributing said feed liquid horizontally through said distributor head apertures above said upper surface of said support plate.

2. The chemical feeder of claim 1, wherein each outlet is positioned below said lower surface of said support plate.

3. The chemical feeder of claim 1, wherein said chemical feeder further comprises a lid that is reversibly attached to an upper portion of said housing sidewall.

4. The chemical feeder of claim 1, wherein the distributor head apertures of at least one distributor head are tangential distributor head apertures through which feed liquid is distributed tangentially above said upper surface of said support plate.

5. The chemical feeder of claim 1, wherein said chemical feeder comprises a plurality of inlets, and said plurality of inlets and said plurality of nozzles form a plurality of separate inlet-nozzle pairs that are in separate fluid communication with each other.

6. The chemical feeder of claim 5, wherein at least one separate inlet-nozzle pair comprises a flexible inlet conduit that provides fluid communication between the inlet and the nozzle of said separate inlet-nozzle pair.

7. The chemical feeder of claim 1, wherein said support plate is supported above said housing base by at least one ledge that extends inward from an inner surface of said housing sidewall.

8. The chemical feeder of claim 1, further comprising a diverter plate extending upward from said upper surface of said support plate at an angle of greater than 0° and less than 90° relative to said upper surface of said support plate, said diverter plate contacting a portion of an inner surface of said housing sidewall, said diverter plate having an upper surface and a lower surface, and said diverter plate supporting laterally said solid chemical material against at least a portion of said upper surface of said diverter plate.

9. The chemical feeder of claim 8, wherein said housing comprises an upper housing chamber residing above said upper surface of said support plate and a lower housing chamber residing below said lower surface of said support plate, said diverter plate dividing said upper housing chamber into a first upper housing chamber and a second upper housing chamber, said solid chemical material residing within said first upper housing chamber, and said second housing chamber being free of solid chemical material.

10. The chemical feeder of claim 9, wherein at least one distributor head extending through said support plate into said first upper housing chamber has feed liquid passing there-through, and each distributor head extending through said support plate into said second upper housing chamber is free of feed liquid passing there-through.

11. The chemical feeder of claim 9, wherein said diverter plate comprises a plurality of diverter plate apertures that provide fluid communication between said first upper housing chamber and said second upper housing chamber.

12. The chemical feeder of claim 8, wherein said support plate comprises at least one first peg extending upward from said upper surface of said support plate, and a lower portion of said upper surface of said diverter plate abuts at least one first peg.

13. The chemical feeder of claim 12, wherein said support plate comprises at least one second peg extending upward from said upper surface of said support plate, and a lower portion of said lower surface of said diverter plate abuts at least one second peg.

14. The chemical feeder of claim 1, wherein said feed liquid distributed by each distributor head contacts solid chemical material supported on said upper surface of said support plate and forms said treated liquid, said treated liquid passes down through said plurality of said support plate apertures and out of said housing through said outlet.

* * * * *